US012629776B2

(12) United States Patent
Pflaum

(10) Patent No.: US 12,629,776 B2
(45) Date of Patent: May 19, 2026

(54) HIGH-SPEED DATA RECORDING AND READING

(71) Applicant: Ceramic Data Solutions GmbH, Gmunden (AT)

(72) Inventor: Christian Pflaum, Bernried (DE)

(73) Assignee: Ceramic Data Solutions GmbH, Gmunden (AT)

( * ) Notice: Subject to any disclaimer, the term of this patent is extended or adjusted under 35 U.S.C. 154(b) by 658 days.

(21) Appl. No.: 18/007,284

(22) PCT Filed: Aug. 14, 2020

(86) PCT No.: PCT/EP2020/072872
§ 371 (c)(1),
(2) Date: Jan. 27, 2023

(87) PCT Pub. No.: WO2022/033701
PCT Pub. Date: Feb. 17, 2022

(65) Prior Publication Data
US 2023/0286081 A1 Sep. 14, 2023

(51) Int. Cl.
| | |
|---|---|
| *B23K 26/359* | (2014.01) |
| *B23K 26/03* | (2006.01) |
| *B23K 26/0622* | (2014.01) |
| *B23K 26/082* | (2014.01) |
| *B23K 103/00* | (2006.01) |
(Continued)

(52) U.S. Cl.
CPC .......... *B23K 26/359* (2015.10); *B23K 26/032* (2013.01); *B23K 26/0624* (2015.10); *B23K 26/082* (2015.10); *B41M 5/007* (2013.01); *B41M 5/262* (2013.01); *B23K 2103/52* (2018.08)

(58) Field of Classification Search
CPC ................ B23K 26/359; B23K 26/032; B23K 26/0624; B23K 26/082; B23K 2103/52; B23K 26/0643; B23K 26/352; B23K 26/355; B23K 26/53; B23K 26/0006; B41M 5/007; B41M 5/262
USPC .......................................................... 430/5
See application file for complete search history.

(56) References Cited

U.S. PATENT DOCUMENTS

| | | |
|---|---|---|
| 4,069,487 A | 1/1978 | Kasai et al. |
| 4,214,249 A | 7/1980 | Kasai et al. |
| 4,556,893 A | 12/1985 | Rinehart et al. |
| | (Continued) | |

FOREIGN PATENT DOCUMENTS

| | | |
|---|---|---|
| CN | 110653494 A | 1/2020 |
| CN | 111014947 A | 4/2020 |
| | (Continued) | |

OTHER PUBLICATIONS

Haight, Richard, et al., "High Resolution Material Ablation and Deposition with Femtosecond Lasers and Applications to Photomask Repair," Journal of Modern Optics, Nov. 10-Dec. 15, 2004, vol. 51, No. 16-18, pp. 2781-2796.
(Continued)

*Primary Examiner* — Caleen O Sullivan
(74) *Attorney, Agent, or Firm* — Lewis & Reese, PLLC

(57) ABSTRACT
The present invention relates to a method of high-speed recording and reading data on or in a layer (10) of a first material and to a device for high-speed recording and reading data on or in a layer (10) of a first material using a laser source (19, a galvanometer (4) and a digital micromirror (5) adapted to emit multiple laser beams.

21 Claims, 4 Drawing Sheets

(51) Int. Cl.
   B41M 5/00 (2006.01)
   B41M 5/26 (2006.01)

(56) References Cited

U.S. PATENT DOCUMENTS

| | | | |
|---|---|---|---|
| 4,797,316 | A | 1/1989 | Hecq et al. |
| 4,811,326 | A | 3/1989 | Gerber |
| 5,063,556 | A | 11/1991 | Chikuma |
| 5,761,111 | A | 6/1998 | Glezer |
| 6,039,898 | A | 3/2000 | Glushko |
| 6,120,907 | A | 9/2000 | Tahon et al. |
| 6,133,986 | A | 10/2000 | Johnson |
| 6,143,468 | A | 11/2000 | Ohno et al. |
| 6,171,730 | B1 | 1/2001 | Kuroda et al. |
| 6,214,250 | B1 | 4/2001 | Moh et al. |
| 6,340,543 | B1 | 1/2002 | Nagamura et al. |
| 6,543,691 | B1 | 4/2003 | Lemelson et al. |
| 8,462,605 | B2 | 6/2013 | Ferren et al. |
| 8,830,810 | B2 | 9/2014 | Yamazaki |
| 10,181,336 | B1 | 1/2019 | Georgiou et al. |
| 10,315,276 | B2 | 6/2019 | Wagner et al. |
| 10,719,239 | B2 | 7/2020 | Rowstron et al. |
| 2002/0028015 | A1 | 3/2002 | Tack-Don et al. |
| 2002/0079297 | A1 | 6/2002 | Harrison |
| 2002/0164069 | A1 | 11/2002 | Nagano et al. |
| 2003/0186624 | A1 | 10/2003 | Koike et al. |
| 2003/0189228 | A1 | 10/2003 | Ieong et al. |
| 2005/0181089 | A1 | 8/2005 | Ogawa et al. |
| 2005/0208392 | A1 | 9/2005 | Yamamoto |
| 2006/0044385 | A1 | 3/2006 | Wurm et al. |
| 2006/0119743 | A1 | 6/2006 | Lin |
| 2006/0120262 | A1 | 6/2006 | Kiyono |
| 2006/0147841 | A1 | 7/2006 | Ohmi et al. |
| 2006/0196945 | A1 | 9/2006 | Mendels |
| 2008/0238611 | A1 | 10/2008 | Costa et al. |
| 2008/0320205 | A1 | 12/2008 | Lunt et al. |
| 2009/0207395 | A1 | 8/2009 | Kasono |
| 2009/0245077 | A1 | 10/2009 | Ueda et al. |
| 2010/0040960 | A1 | 2/2010 | Piao et al. |
| 2010/0135147 | A1 | 6/2010 | Bard et al. |
| 2010/0151391 | A1 | 6/2010 | Neogi et al. |
| 2010/0289186 | A1 | 11/2010 | Longo et al. |
| 2011/0318695 | A1 | 12/2011 | Hwang et al. |
| 2013/0273259 | A1 | 10/2013 | Depardieu et al. |
| 2015/0077535 | A1 | 3/2015 | Izatt et al. |
| 2015/0302926 | A1 | 10/2015 | Shiozawa et al. |
| 2015/0324677 | A1 | 11/2015 | Talyansky et al. |
| 2015/0382476 | A1 | 12/2015 | Zenou et al. |
| 2016/0118077 | A1 | 4/2016 | Lunt et al. |
| 2016/0199935 | A1 | 7/2016 | Chen et al. |
| 2018/0039806 | A1 | 2/2018 | Harrison |
| 2018/0130531 | A1 | 5/2018 | Ahner et al. |
| 2018/0246415 | A1 | 8/2018 | Xalter et al. |
| 2019/0273025 | A1 | 9/2019 | Chen et al. |
| 2019/0324240 | A1 | 10/2019 | Shroff et al. |
| 2019/0353912 | A1 | 11/2019 | Chen et al. |
| 2020/0075383 | A1 | 3/2020 | Minemura |
| 2020/0142171 | A1 | 5/2020 | Xiong et al. |

FOREIGN PATENT DOCUMENTS

| | | | |
|---|---|---|---|
| DE | 19724214 | | 12/1998 |
| DE | 102014118497 | | 6/2017 |
| EP | 2157533 | | 2/2010 |
| EP | 3109058 | | 12/2016 |
| EP | 3031785 | | 10/2018 |
| EP | 3955248 | | 2/2022 |
| EP | 4044182 | | 8/2022 |
| JP | H02-215587 | | 8/1990 |
| JP | H02-277689 | | 11/1990 |
| JP | 2002-351055 | A | 3/2002 |
| JP | 2003-137677 | | 5/2003 |
| JP | 2004-062981 | | 2/2004 |
| JP | 3913319 | B2 | 5/2007 |
| JP | 2007-319921 | | 12/2007 |
| JP | 4891567 | B2 | 3/2012 |
| JP | 6689067 | | 4/2020 |
| KR | 20010112497 | A1 | 12/2001 |
| WO | 91/13440 | | 9/1991 |
| WO | 99/45441 | | 9/1999 |
| WO | 2000/073983 | | 12/2000 |
| WO | 2021/028035 | | 2/2021 |
| WO | 2022/002418 | | 1/2022 |
| WO | 2022/002444 | | 1/2022 |
| WO | 2022/033701 | | 2/2022 |
| WO | 2022/033800 | | 2/2022 |
| WO | 2022/194354 | | 9/2022 |

OTHER PUBLICATIONS

Morishige, Yukio, "High Accuracy Laser Mask Repair Technology Using ps UV Solid State Laser," Second International Symposium on Laser Precision Microfabrication, Proceedings of SPIE, vol. 4426, 2002, pp. 416-423.

Venketakrishnan, K., et al., "Laser Writing Techniques for Photomask Fabrication Using a Femtosecond Laser," Applied Physics A Materials Science & Processing, vol. 74, 2002, pp. 493-496.

Gustafsson, Mats G.L., "Nonlinear Structured-Illumination Microscopy: Wide-Field Fluorescence Imaging with Theoretically Unlimited Resolution," PNAS, vol. 102, No. 37, Sep. 13, 2005, pp. 13081-13086.

Watanabe M., et al., "Three-Dimensional Optical Data Storage in Vitreous Silica," Japanese Journal of Applied Physics, JP, vol. 37, No. 12 B, part 02, Dec. 15, 1998.

Glezer, E. N., et al., "Three-Dimensional Optical Storage Inside Transparent Materials," Optics Letters, vol. 21, No. 24, Dec. 15, 1996, 3 pages.

Glezer E. N., et al., "Ultrafast-Laser Driven Micro-Explosions in Transparent Materials," Appl. Phys., Lett. 71 (7), Aug. 18, 1997, 3 pages.

Benton, David M., "Multiple Beam Steering Using Dynamic Zone Plates on a Micro-Mirror Array," Optical Engineering, 57 (7), 2018, 13 pages.

Qi, Z.B., et al., "A Comprehensive Study of the Oxidation Behavior of Cr2N and CrN Coatings," 544, 2013, pp. 515-520.

Webster's Ninth New Collegiate Dictionary; Merrian-Webster Inc.; Springfield, Mass, USA; 1990 (no month); excerpt p. 224.

"Glass Composition, Glass Types," retrieved Dec. 17, 2020 from website://glassproperties.com/glasses.

International Search Report and Written Opinion regarding corresponding PCT Application No. PCT/EP2020/072872, mailed May 6, 2021.

Communication Pursuant to Article 94(3) EPC regarding corresponding EP Application No. 20758149.7, mailed Oct. 14, 2022.

A. Laskin et al., "Beam-shaping unit for micromachining," Proceedings of SPIE—The Int'l Soc. for Optical Eng'g (Sep. 2013).

First Office Action regarding corresponding Chinese Patent Application No. 202080103125.0, mailed Oct. 16, 2024.

Examination Report regarding corresponding Indian Patent Application No. 202217075435, mailed Oct. 13, 2025.

HIGH-SPEED DATA RECORDING AND READING

INTRODUCTION

The present invention relates to a method for high-speed recording data on or in a layer of a first material and to a device for high-speed recording data on or in a layer of a first material.

It has been known for quite a while that spatial light modulators (SLM) or digital micromirror devices (DMD) can be used to selectively manipulate regions on or in a layer of a material, for example to create photomasks for semiconductor devices and displays (see, e.g., WO 99/45441). Utilizing an array or a matrix of micromirrors, a huge number of pixels may be illuminated simultaneously and in a well-controlled manner to create, e.g., a desired pattern in a photomask.

However, the laser light used for illumination does not directly manipulate the substrate material of, e.g., a semiconductor. Rather, an indirect process called photolithography is used to etch the desired pattern into the substrate material. In this process, a light-sensitive photoresist is manipulated by the laser light.

While photolithography techniques have been proven extremely successful in the semiconductor industry, it may be desirable to directly manipulate certain material layers, for example for recording data on ceramic materials (see WO 2021/028035 and WO 2022/002418). Yet, the power density of the laser light required for, e.g., ablating material from a ceramic layer is much higher than that necessary to chemically change the photoresist. Since the total laser power provided by the laser system cannot be indefinitely upscaled, at least not for reasonable costs, recording velocity is heavily compromised for many materials.

SUMMARY

It is thus an object of the present invention to provide a method for high-speed recording data on or in a layer of a first material and a device for such high-speed recording data.

Accordingly, the present invention, according to a first aspect, relates to a method for high-speed recording data on or in a layer of a first material. The method comprises the steps of providing a layer of a first material, and selectively illuminating a plurality of regions of the layer of the first material with laser light in order to selectively manipulate material at the plurality of regions of the layer of the first material. The plurality of regions of the layer of the first material are selectively illuminated by means of a combination of a galvanometer scanner and a digital micromirror device.

The present invention is thus, inter alia, based on the idea to distribute the laser power over the digital micromirror device (DMD) by means of a galvanometer scanner. Rather than illuminating all micromirrors of the DMD simultaneously, a sub-array of micromirrors of the DMD is illuminated at each time and said sub-array is scanned by means of the galvanometer scanner. This allows for extremely quickly addressing all sub-arrays of micromirrors sequentially and at the same time substantially reduces the total laser power required: Since the power density of each beamlet generated by each micromirror of the DMD has to be sufficient to, e.g., ablate ceramic material, the total power to be provided by the laser source scales with the number of micromirrors illuminated simultaneously. Thus, data recording speeds of at least 10 MB/s, preferably at least 100 MB/s, more preferably at least one GB/s and even more preferably at least 10 GB/s can be achieved by utilizing a standard laser source having an output power of, e.g., 1 W or an output energy of a single pulse (for a pulsed laser) of, e.g., 10 μJ.

Selectively manipulating material at the plurality of regions of the layer of the first material may comprise heating, decomposing, oxidizing, deforming, ablating, melting and/or vaporizing the respective regions of the layer of the first material as long as said manipulation is suitable for recording data by creating well-defined local effects which are visible, optically detectable or detectable by any other mechanism. For example, the recorded data may be encoded on the layer of the first material (e.g., by means of changing the surface properties such as colour, optical absorption or the like) or in the layer of the first material (e.g., by creating recessions or holes in the material). In the latter case, recesses or holes of different depths may be created, wherein each depth corresponds to a predefined bit of information as described in WO 2022/002418. For this purpose, the layer of the first material may be illuminated with two or more laser pulses, wherein the micromirrors of the DMD are adjusted between subsequent pulses so as to achieve regions which are (i) never illuminated, (ii) illuminated once with a single laser pulse, (iii) illuminated twice with two laser pulses and so on.

Typically, the laser light or laser pulse will heat the impact areas of the laser beam which, in turn, may cause decomposition, oxidation, deformation, ablation, melting and/or vaporization of the material within or close to the impact areas. If an ultra-short pulse laser such as a picosecond laser or a femtosecond laser is used, either the laser beam creates so-called nano-ripples for low energy densities dependent on the polarisation of the beam or so-called Coulomb explosions may lead to material ablation at higher energy densities. Dependent on the polarisation of the beam such Coulomb explosions may create recordable oval shaped recesses or holes with the long and short axes of the oval being dependent again on the polarisation of the beam.

Preferably, the laser light illuminating the plurality of regions of the layer of the first material passes, in this sequence, the galvanometer scanner and the DMD. This arrangement is optionally much more precise as compared to an arrangement where the DMD is located in front of the galvanometer scanner because the DMD guarantees a well-defined and fixed relationship between each micromirror and a corresponding pixel on the surface of the layer of the first material. This is, in particular, advantageous if several laser pulses have to be applied to one and the same pixel in order to, e.g., achieve different depths as discussed above and/or to provide for correction of pixels which might not have been properly manipulated. It is important to note that the sequence of the galvanometer scanner and the DMD does not require the DMD to be positioned directly behind the galvanometer scanner. Rather, additional optics may be present between the galvanometer scanner and the DMD. For example, a further collimating optics may be present in order to align the laser light emitted by the galvanometer scanner to a predetermined entrance angle with respect to the DMD.

Preferably, the laser light emitted from the galvanometer scanner simultaneously illuminates only a section of the micromirror array of the digital micromirror device. Said illuminated section may amount to less than 10%, preferably less than 1%, more preferably less than 0.1%, even more preferably less than 0.05% and most preferably less than 0.03% of the micromirror array of the DMD. Said percentage may be calculated in terms of the illuminated area (compared to the total area of the micromirror array of the DMD) or in terms of the number of illuminated micromirrors (compared to the total number of micromirrors of the DMD). As outlined above, the full area of the micromirror array of the DMD (that is all micromirrors of the DMD) is utilized by scanning the micromirror array of the DMD with the illuminated section by means of the galvanometer scanner. Of course, the laser source and the galvanometer scanner have to be controlled accordingly in order to ensure, for example, that a laser pulse (or several laser pulses) is emitted for each position of the galvanometer scanner. In other words, for each sub-array of micromirrors of the DMD (i.e. a section to be illuminated), a laser pulse is being emitted by the laser source in order to illuminate the corresponding pixels on the surface of the layer of the first material. Preferably, these sub-arrays are scanned line by line. However, any other regular or arbitrary pattern is, in principle, possible.

Since this method limits the number of possible pixels to the number of micromirrors of the DMD, the recording area of the layer of the first material may be further extended by using an XY positioning system such as a scanning stage (with the z-axis being perpendicular to the surface of the layer of the first material). Once a full array of pixels corresponding to the entire DMD have been recorded, an adjacent array of pixels may be recorded by simply moving the layer of the first material to an adjacent area. Accordingly, the inventive method preferably comprises the steps of illuminating a plurality of regions of the layer of the first material with laser light in order to selectively manipulate material at the plurality of regions of the layer of the first material utilizing a first sub-array of micromirrors of the DMD; aiming, with the galvanometer scanner, at another, preferably adjacent, second sub-array of micromirrors of the DMD; and selectively illuminating a plurality of regions of the layer of the first material with laser light in order to selectively manipulate material at the plurality of regions of the layer of the first material using the second sub-array of micromirrors of the DMD. This sequence is preferably repeated until all sub-arrays of the micromirror array of the DMD have been utilized. Subsequently, the layer of the first material is translated so that a second area different from the previous area can be covered by the DMD; and the above-mentioned sequence is repeated for this second area.

As mentioned previously, the laser light emitted from the galvanometer scanner may pass through collimating optics in order to align the laser light to a predetermined entrance angle with respect to the DMD. This is advantageous because the angle of the laser light emitted from the galvanometer scanner depends on the position which the galvanometer scanner aims at.

The light emitted from the DMD may pass through beam shaping optics, preferably a matrix of laser zone plates or a spatial light modulator. Thus, certain beam shapes may be created which are advantageous for data recording. For example, a matrix of laser zone plates may be adapted to create a Bessel beam for each beamlet emitted by the DMD.

A Bessel beam has the advantage of a substantially increased depth of focus. While the focus length of a regular Gaussian beam is in the order of the wavelength of the focused light, the focus length which can be achieved with a Bessel beam amounts to at least 4 times the wavelength of the focus light. At the same time, the width of the focus is about one half of the focus width which can be achieved by a Gaussian beam.

In general, the size of the features which can be achieved by the inventive method (e.g. the diameter of a recess in the layer of the first material) varies between $\frac{2}{3}$ $\lambda$ (air) and $\frac{1}{2}$ $\lambda$ (immersion) for a Gaussian beam and between $\frac{1}{3}$ $\lambda$ (air) and $\frac{1}{4}$ $\lambda$ (immersion) for a Bessel beam (where $\lambda$ is the wavelength of the laser light). Thus, the Bessel beam shape is advantageous in that smaller process features and, accordingly, a larger recorded data density can be achieved. Moreover, the increased focal length of the Bessel beam is advantageous in that, for example, deeper recesses may be generated. This is, in particular, of relevance if features of different depths are to be generated in order to encode information by means of, e.g., the depth of a recess. Since the focus of a Gaussian beam is cone-shaped, increasing the depth of a recess implies enhancing the diameter of the recess at the surface. By contrast, the more cylindrical focus of a Bessel beam allows for creating much deeper recesses with almost constant diameter.

Such Bessel beams may also be generated by means of other beam shaping devices. One particularly preferred example of a beam shaping device is a spatial light modulator, which is particularly versatile because it can be utilized to create Bessel beams, to allow for optical proximity control and to provide a phase-shift mask.

Preferably, the layer of the first material is a ceramic material which preferably comprises a metal nitride such as $CrN$, $CrAlN$, $TiN$, $TiCN$, $TiAlN$, $ZrN$, $AlN$, $VN$, $Si_3N_4$, $ThN$, $HfN$, $BN$; and/or a metal carbide such as $TiC$, $CrC$, $Al_4C_3$, $VC$, $ZrC$, $HfC$, $ThC$, $B_4C$, $SiC$; and/or a metal oxide such as $Al_2O_3$, $TiO_2$, $SiO_2$, $ZrO_2$, $ThO_2$, $MgO$, $Cr_2O_3$, $Zr_2O_3$, $V_2O_3$; and/or a metal boride such as $TiB_2$, $ZrB_2$, $CrB_2$, $VB_2$, $SiB_6$, $ThB_2$, $HfB_2$, $WB_2$, $WB_4$; and/or a metal silicide such as $TiSi_2$, $ZrSi_2$, $MoSi_2$, $WSi_2$, $PtSi$, $Mg_2Si$. Particular preferred materials are $B_4C$, $HfC$, $Cr_2O_3$, $ZrB_2$, $CrB_2$, $SiB_6$, $Si_3N_4$, $ThN$, $CrN$ and $CrAlN$. These materials provide sufficient hardness and resistance to environmental degradation for long term storage of the recorded data.

Preferably, the step of providing a layer of the first material comprises providing a ceramic substrate and coating the substrate with a layer of the first material different from the material of the ceramic substrate. Thus, only a small amount of the possibly more expensive coating material is needed while structural integrity is achieved with a robust and potentially cheaper substrate. The layer of the first material preferably has a thickness no greater than 10 μm, more preferably no greater than 5 μm, more preferably no greater than 2 μm, more preferably no greater than 1 μm, even more preferably no greater than 100 nm and most preferably no greater than 10 nm.

Furthermore, the use of a substrate may allow for generating optical contrast between the substrate (where a hole is generated in the coating) and the surrounding coating material. Preferably, the manipulation of the selected regions causes these regions to become distinguishable from the surrounding material. For some applications, this may comprise to achieve optical distinguishability. However, in other instances (in particular, if the encoded structures are too small) these areas may only be distinguished from the surrounding material by means of, e.g., a scanning electron microscope or measurement of another physical parameter change for example of magnetic, dielectric or conductive properties.

Preferably, the ceramic substrate comprises an oxidic ceramic, more preferably the ceramic substrate comprises at least 90%, most preferably at least 95%, by weight of one or a combination of: $Al_2O_3$, $TiO_2$, $SiO_2$, $ZrO_2$, $ThO_2$, $MgO$, $Cr_2O_3$, $Zr_2O_3$, $V_2O_3$. These materials are known to be particularly durable under various circumstances and/or to resist environmental degradation. Thus, these materials are particularly suitable for long-term storage under different conditions. It is particularly preferred that the ceramic substrate comprises one or a combination of: $Al_2O_3$, $ZrO_2$, $Zr(SiO_4)$, $SiO_2$, and $MgO$.

Preferably, the ceramic substrate comprises a non-oxidic ceramic, more preferably the ceramic substrate comprises at least 90%, most preferably at least 95%, by weight of one or a combination of: a metal nitride such as CrN, CrAlN, TiN, TiCN, TiAlN, ZrN, AlN, VN, $Si_3N_4$, ThN, HfN, BN; a metal carbide such as TiC, CrC, $Al_4C_3$, VC, ZrC, HfC, ThC, $B_4C$, SiC; a metal boride such as $TiB_2$, $ZrB_2$, $CrB_2$, $VB_2$, $SiB_6$, $ThB_2$, $HfB_2$, $WB_2$, $WB_4$; and a metal silicide such as $TiSi_2$, $ZrSi_2$, $MoSi_2$, $WSi_2$, PtSi, $Mg_2Si$. These materials are known to be particularly durable under various circumstances and/or to resist environmental degradation. Thus, these materials are particularly suitable for long-term storage under different conditions. It is particularly preferred that the ceramic substrate comprises one or a combination of: BN, $CrSi_2$, SiC, and $SiB_6$.

Preferably, the ceramic substrate comprises one or a combination of Ni, Cr, Co, Fe, W, Mo or other metals with a melting point above 1,400° C. Preferably, the ceramic material and the metal form a metal matrix composite with the ceramic material being dispersed in the metal or metal alloy. Preferably, the metal amounts to 5-30% by weight, preferably 10-20% by weight of the ceramic substrate, i.e. the metal matrix composite. Particularly preferred metal matrix composites are: WC/Co—Ni—Mo, BN/Co—Ni—Mo, TiN/Co—Ni—Mo and/or SiC/Co—Ni—Mo.

The layer of the first/ceramic material is preferably coated directly onto the ceramic substrate, i.e. without any intermediate layer being present, so as to achieve a strong bond between the ceramic substrate and the layer of the first/ceramic material. The coated ceramic substrate is preferably tempered before and/or after recording in order to achieve such strong bonding. Tempering may generate a sintered interface between the ceramic substrate and the layer of the first/ceramic material. The sintered interface may comprise at least one element from both the substrate material and the first/ceramic material because one or more elements from one of the two adjacent layers may diffuse into the other layer of the two adjacent layers. The presence of the sintered interface may further strengthen the bond between the ceramic substrate and the layer of the ceramic material.

Preferably tempering the coated ceramic substrate involves heating the coated ceramic substrate to a temperature within a range of 200° C. to 4,000° C., more preferably within a range of 1,000° C. to 2,000° C. The tempering process may comprise a heating phase with a temperature increase of at least 10 K per hour, a plateau phase at a peak temperature for at least 1 minute and finally a cooling phase with a temperature decrease of at least 10 K per hour. The tempering process may assist in hardening the ceramic substrate and/or permanently bonding the second material to the ceramic substrate.

Preferably the selected regions are heated to at least a melting temperature of the first material such that the selected regions of the first material are heated to a temperature of at least 3,000° C., even more preferably at least 3,200° C., most preferably at least 3,500° C., most preferably at least 4,000° C. Laser ablation of selected regions of the first/ceramic material may reveal the underlying ceramic substrate leading to a (optically) distinguishable contrast of the selected regions relative to the rest of the recording material.

In order to provide the required amount of energy in a short amount of time and to, thus, allow for high-speed recording data, it is particularly preferred that the laser light is provided by an ultra-short pulse laser, preferably a picosecond laser or a femtosecond laser.

According to a further aspect, the present invention relates to a device for high-speed recording data on or in a layer of a first material. The device comprises a laser source, a galvanometer scanner, a digital micromirror device (DMD) adapted to emit multiple laser beams, a substrate holder for mounting a substrate, and focusing optics adapted for focusing each of the multiple laser beams emitted by the DMD onto a substrate mounted on the substrate holder. The galvanometer scanner is configured to temporally distribute the laser power over the DMD.

All preferred features discussed above in the context of the inventive method may also be employed analogously in the context of the inventive device. In other words, the device, one or more of its components and/or a controller of the device may be suitable to perform and/or allow for the above-mentioned method steps.

For example, the galvanometer device is preferably configured to simultaneously illuminate only a section of the micromirror array of the DMD. As discussed above, the illuminated section amounts preferably to less than 10%, more preferably less than 1%, even more preferably less than 0.1%, even more preferably less than 0.05% and most preferably less than 0.03% of the micromirror array of the DMD. Accordingly, the galvanometer scanner is preferably configured to scan the micromirror array of the DMD with the illuminated section.

The device preferably further comprises optics in order to align the laser light emitted by the galvanometer scanner to a predetermined entrance angle with respect to the DMD. Additionally or alternatively, beam shaping optics such as a matrix of laser zone plates or a spatial light modulator may be provided. The spatial light modulator is preferably configured to allow for optical proximity control, to generate Bessel beams, or to create a phase shift mask.

The device preferably further comprises a flat top beam shaper including collimating optics in order to ensure that the power density is as constant as possible over the beam profile. Thus, the energy per pulse does not depend on the location of the micromirror being in an "on"-state and, accordingly, on the area of the substrate being manipulated. For this purpose, for example a πShaper as described in A. Laskin et al., "Beam-shaping unit for micromachining," Proceedings of SPIE: The Int'l Soc. for Optical Eng'g (September 2013), may be used. Alternatively, an SLM may be used to generate a flat beam profile.

The laser source preferably is an ultrashort pulse laser such as a picosecond laser or a femtosecond laser.

The power density of each of the multiple laser beams emitted by the DMD is preferably greater than 100 $mJ/cm^2$, more preferably greater than 400 $mJ/cm^2$, even more preferably greater than 800 $mJ/cm^2$ and most preferably greater than 1 $J/cm^2$.

At the substrate, each of the multiple laser beams preferably is a Bessel beam. At the substrate, each of the multiple laser beams preferably has a minimum focal diameter no greater than 400 nm, more preferably no greater than 300 nm, even more preferably no greater than 200 nm, and most preferably no greater than 100 nm.

The substrate holder is preferably mounted on an XY positioning system such as a scanning stage.

The device preferably comprises a processor configured for controlling the DMD, the galvanometer scanner and the laser source and optionally the XY positioning system so as to sequentially illuminate adjacent areas or pixel arrays of the substrate mounted on the substrate holder.

This processor (or an additional processing unit) is preferably adapted and configured to receive a set of data to be recorded (i.e., analogue or digital data such as text, numbers, an array of pixels, a QR code or the like) and to control the components of the device (in particular, the DMD, the galvanometer scanner and the laser source as well as optionally the XY positioning system and the beam shaping device) to perform the inventive method so as to record the received set of data on or in the layer of the first material.

Preferably, the device further comprises a reading device configured to image the recorded data. Such a reading device allows for quality control during data recording and preferably for adjusting defective pixels by a second illumination shot. Said quality control may be performed during recording. For example, once all sub-arrays of micromirrors of the DMD have been utilized for illuminating corresponding pixels on the surface of the layer of the first material (i.e., once a full scan of the galvanometer scanner over the DMD has been completed), recording may be briefly interrupted and the reading device may image the array of recorded pixels by, e.g., comparing the readout data with the data set to be recorded. If one or more defective pixels are identified (for example, pixels corresponding to recesses which are not sufficiently deep or which don't have a sufficient diameter), the galvanometer scanner and the DMD may be controlled so as to again illuminate those defective pixels in order to improve quality of the recording.

The reading device may comprise a digital camera or other imaging device. It is, however, particularly preferred that the reading device comprises a combination of an optical sensor with a further DMD. With the help of the DMD, light source and a simple light sensor the measurement principle of a confocal laser scanning microscope can be implemented, by using individual micromirrors of the DMD to serve as "movable pinhole" as an alternative to a fixed pinhole and a scanning laser. Illumination of the area to be imaged may be achieved by the laser source for data recording or another laser source using the DMD of the recording path for sequentially illuminating the pixels to be imaged and controlling both DMDs to address the same pixel at a time. However, the illumination area might be too small in this case. Thus, it may be preferable to utilize an additional light source for illuminating a much larger area and to merely use the reader's DMD for scanning the pixels. The additional light source may be provided in the reading device or external thereto.

In order to allow for reading essentially during recording the device preferably comprises a beam splitter between the DMD and the focusing optics, wherein the beam splitter allows for light emitted from the substrate to pass to the reading device. Alternatively, a beam splitter may be provided between the galvanometer scanner and the DMD, wherein the beam splitter allows for light emitted from the substrate to pass to the reading device via the DMD. In this case, the reading device may not need a further DMD. Rather, reading may be performed utilizing the DMD of the recording path. This is a particularly advantageous arrangement because only a single DMD is required.

While the invention above has been described in the context of high-speed recording data, the invention is not limited to this particular application. Rather, the present invention may generally be used for micro-manipulating a surface of an object. For example, the present invention may also comprise a method for micro-manipulating a surface of an object, the method comprising the steps of: providing an object having a surface; and selectively illuminating a plurality of regions of the surface with laser light in order to selectively manipulate material at the plurality of regions of the surface; wherein the plurality of regions of the surface are selectively illuminated by means of a combination of a galvanometer scanner and a digital micromirror device.

In this method for micro-manipulating an object, the laser light illuminating the plurality of regions of the surface may pass, in this sequence, the galvanometer scanner and the digital micromirror device. The laser light emitted from the galvanometer scanner simultaneously may also illuminate only a section of the micromirror array or matrix of the digital micromirror device. The illuminated section may amount to less than 10%, preferably less than 1%, more preferably less than 0.1% of the micromirror array of the digital micromirror device. The micromirror array of the digital micromirror device may be scanned with the illuminated section by means of the galvanometer scanner. The laser light emitted from the galvanometer scanner may passes through optics in order to align the laser light to a predetermined entrance angle with respect to the digital micromirror device. The light emitted from the digital micromirror device may pass through beam shaping optics, preferably a matrix of laser zone plates or a spatial light modulator. The laser light may be provided by an ultra-short-pulse laser. The surface may comprises one or a combination of the following materials: ceramic material, metal, plastics, organic material, inorganic material. The surface may be substantially plane. The object may be selected from: machines, electronic und building components, turbine blades, wind turbine blades, airplane wings, surface coatings, pistons, valves, moulds, machine shafts, gears, suspensions, rotors, connectors, electrodes, battery electrodes, resistors, capacitors, integrated circuits, circuit boards, electronic devices, device displays, parts of mechanical watches, jewelry, windows, doors, pipes, roof tiles, solar panels. Selectively manipulating material from the plurality of regions of the surface may comprise one of more of the following: creating regular and/or irregular surface structures, creating a pattern such as nanoripples in the surface, creating a predetermined roughness in the surface, creating holes of different shapes and/or different sizes and/or different depths. The manipulated regions have a mean size of less than 10 μm, preferably of less than 3 μm, more preferably of less than 1 μm, even more preferably of less than 500 nm, even more preferably of less than 300 nm, most preferably of less than 100 nm. The manipulated regions may have a mean depth of less than 10 μm, preferably of less than 3 μm, more preferably of less than 1 μm, even more preferably of less than 500 nm, even more preferably of less than 300 nm, even more preferably of less than 100 nm, even more preferably of less than 10 nm.

The disclosed and claimed methods and devices may be used for any of the following: individually marking the surface of any object, wherein said marking may include production parameters and/or a certificate of authenticity; providing repetitive micro- or nano-structures on the surface of any object enabling special surface properties like lotus effect or friction coefficient.

BRIEF DESCRIPTION OF THE DRAWINGS

Preferred embodiments of the present invention will be further elucidated below with reference to the figures.

DETAILED DESCRIPTION

Figure 1:
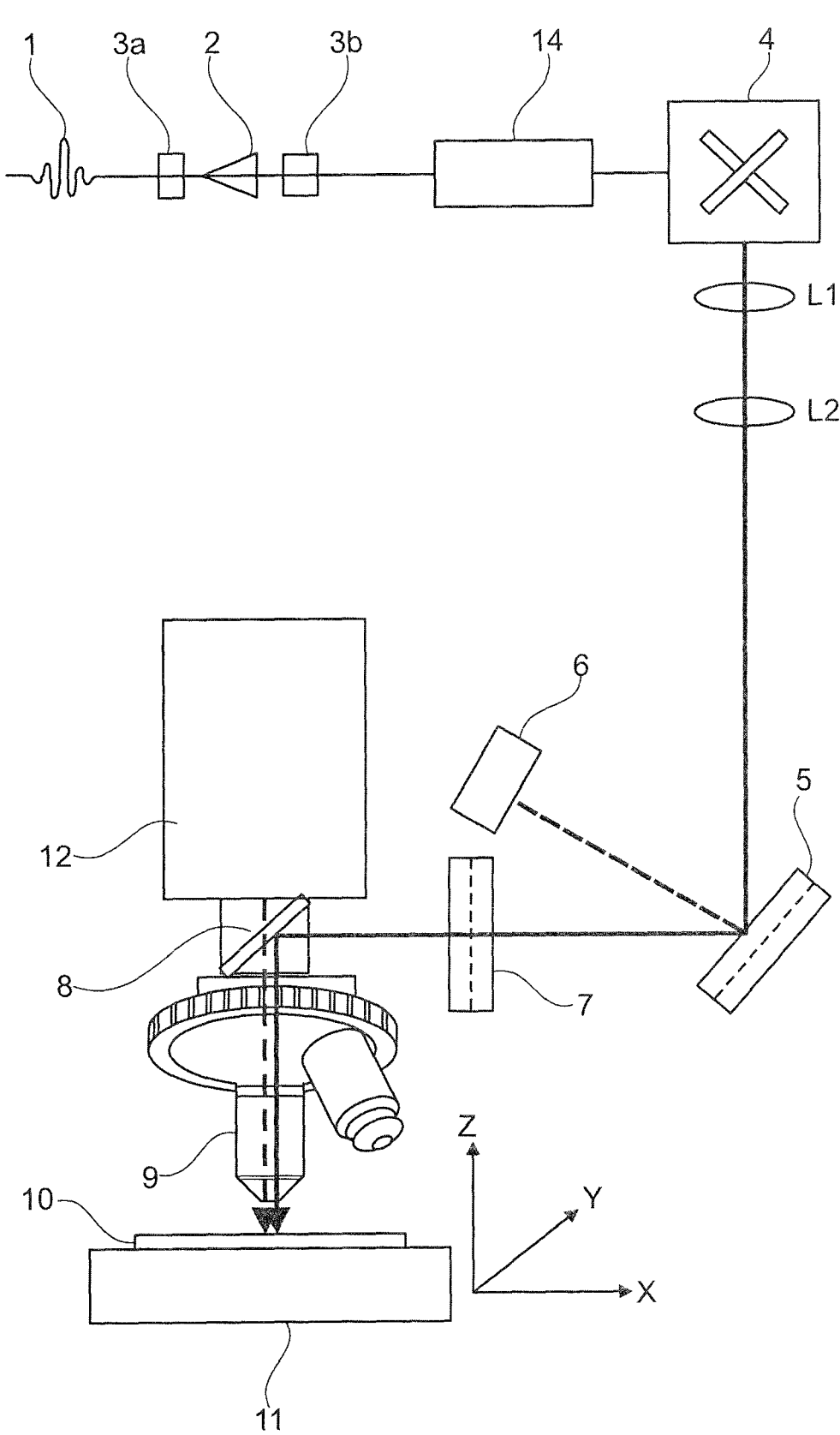
FIG. 1 shows a schematic view of a device for high-speed recording data according to a preferred embodiment.

FIG. 1 shows a schematic illustration of a device for high-speed recording data on or in a layer of a first material according to a preferred embodiment of the present invention. The device comprises a laser source 1, a motorized attenuator 3a, a beam expander 2, an attenuation rotator 3b, a flat top beam shaper (preferably including collimating optics) 14, a galvanometer scanner 4, a digital micromirror device 5 adapted to emit multiple laser beams (of which only a single one is shown for simplicity), a substrate holder 11 for mounting a substrate 10, and focusing optics 9 adapted for focusing each of the multiple laser beams emitted by the DMD 5 onto the substrate 10 mounted on the substrate holder 11.

The galvanometer scanner 4 is configured to temporally distribute the laser power of the laser source 1 over the DMD 5. As explained above, the galvanometer device 4 is configured to simultaneously illuminate only a section of the micromirror array of the DMD 5. Since the angle of the laser beam emitted from the galvanometer scanner 4 depends on the position or area on the DMD 5 which the galvanometer scanner 4 aims at, the device preferably comprises collimating optics L1, L2 in order to align the laser light emitted by the galvanometer scanner 4 to a predetermined entrance angle with respect to the DMD 5. In order to properly illuminate the galvanometer scanner 4 by means of the laser source 1 a motorized attenuator 3a, a beam expander 2, an attenuation rotator 3b, and a flat top beam shaper (preferably including collimating optics) 14 may be provided.

The DMD 5 comprises multiple micromirrors arranged in an array (not shown) and is adapted to emit multiple laser beams (not shown) along either a first direction (i.e., for recording) or along a second direction for each micromirror being in an "off" state diverting those laser beams into a beam dump 6. For each micromirror being in an "on" state, a laser beam is emitted via a beam splitter 8 through a focusing optics 9 which may, for example, comprise standard microscope optics having a high numerical aperture, onto the substrate 10 being mounted on an XY positioning system (which may optionally also be movable along the Z direction).

As discussed above, the device may further comprise beam shaping optics 7 such as a matrix of laser zone plates or a spatial light modulator, which may be configured to allow for optical proximity control, to generate Bessel beams, or to create a phase-shift mask.

In the embodiment shown in FIG. 1, the device further comprises a reading device 12 configured to image the recorded data. The reading device in this embodiment comprises a further DMD (not shown) for addressing each pixel in reading mode. Alternatively, a high-resolution digital camera might be utilized for imaging the recorded pixels. The beam splitter 8 is positioned between the DMD 5 and the focusing optics 9 in order to allow for light emitted from the substrate 10 to pass to the reading device 12.

Illumination of the area to be imaged by the reading device 12 may be achieved by the laser source 1 for data recording or another laser source using the DMD 5 of the recording path for sequentially illuminating the pixels to be imaged and controlling both DMDs to address the same pixel at a time. In order to be able to resolve the tiny structures generated during recording, it is preferred to use a smaller wavelength for imaging. For example, the recording laser 1 may emit another harmonic having half of the recording wavelength. Alternatively, another laser source having a different wavelength may be present in the system. However, the illumination area might still be too small in this case. Thus, it may be preferable to utilize an additional light source for illuminating a much larger area and to merely use the reader's DMD for scanning the pixels. The additional light source may be provided in the reading device 12 or external thereto. In the latter case, the illuminating light may be guided onto the surface to be imaged by means of the beam splitter 8 or an additional beam splitter (not shown) along the optical path.

Figure 2:
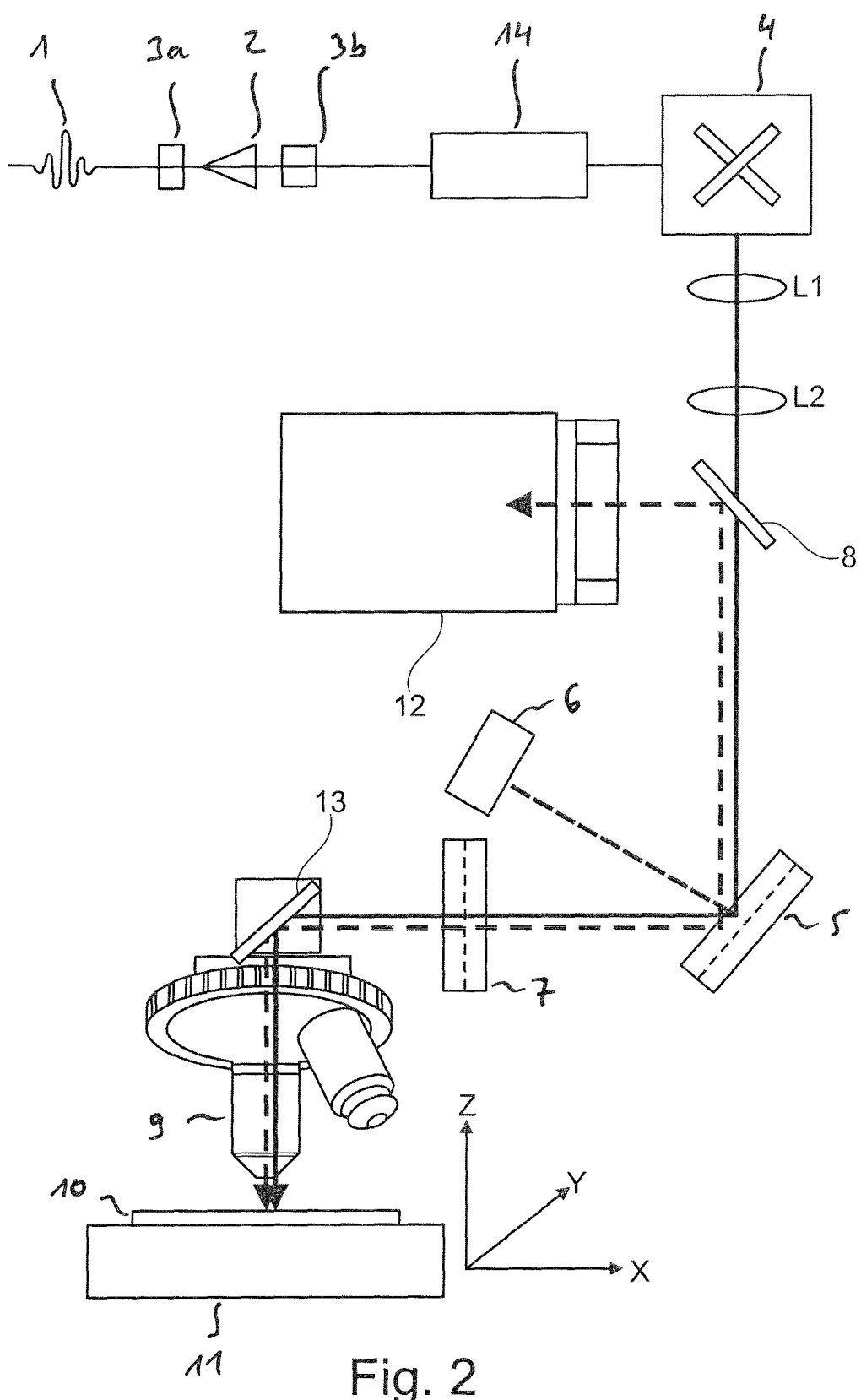
FIG. 2 shows a schematic view of a device for high-speed recording data according to another preferred embodiment.

In an alternative embodiment shown in FIG. 2, the beam splitter 8 is provided between the galvanometer scanner 4 and the DMD 5 and allows for light emitted from the substrate 10 to pass to the reading device 12 via the DMD 5. In this case, light emitted from the DMD 5 may be passed directly or via an additional mirror or beam splitter 13 to the focusing optics 9. The arrangement shown in FIG. 2 is particularly advantageous as the reading device 12 in this arrangement does not require its own DMD. Rather, a simple optical sensor may be sufficient because each pixel on the substrate 10 may be addressed via the DMD 5 along the recording beam. As described above, this alternative mimics the principle of a confocal microscope. Yet, instead of a scanning laser beam and a fixed pinhole the selected micromirrors define a path of a "movable pinhole". Again, illumination may be achieved via the recording laser 1 and the recording path. It is, however, preferred to illuminate the substrate 10 with, e.g., UV light emitted from an additional light source via beam splitter 13 or an additional beam splitter along the optical path such as beam splitter 8.

Figure 3:
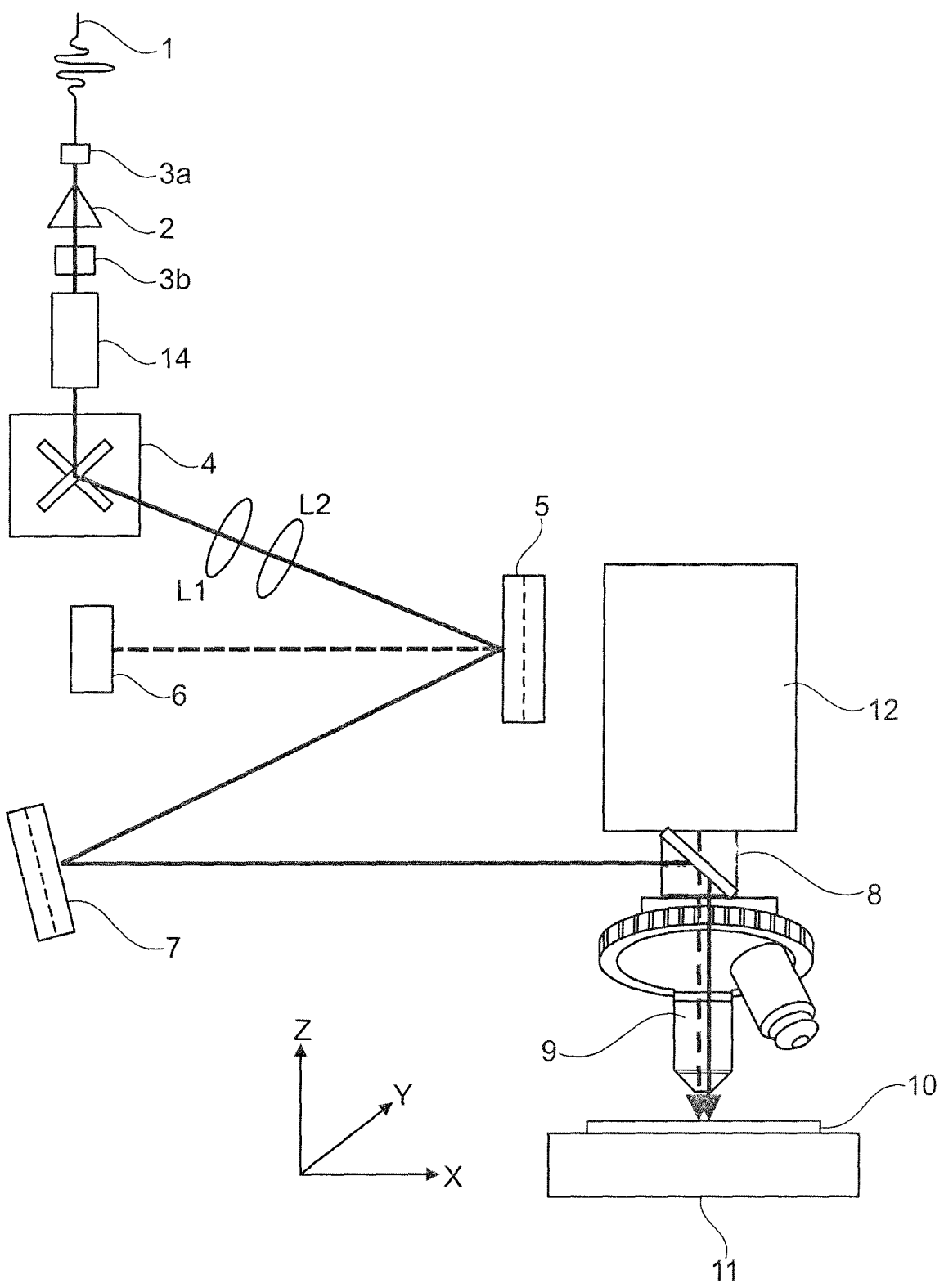
FIG. 3 shows a schematic view of a device for high-speed recording data according to another preferred embodiment.
Figure 4:
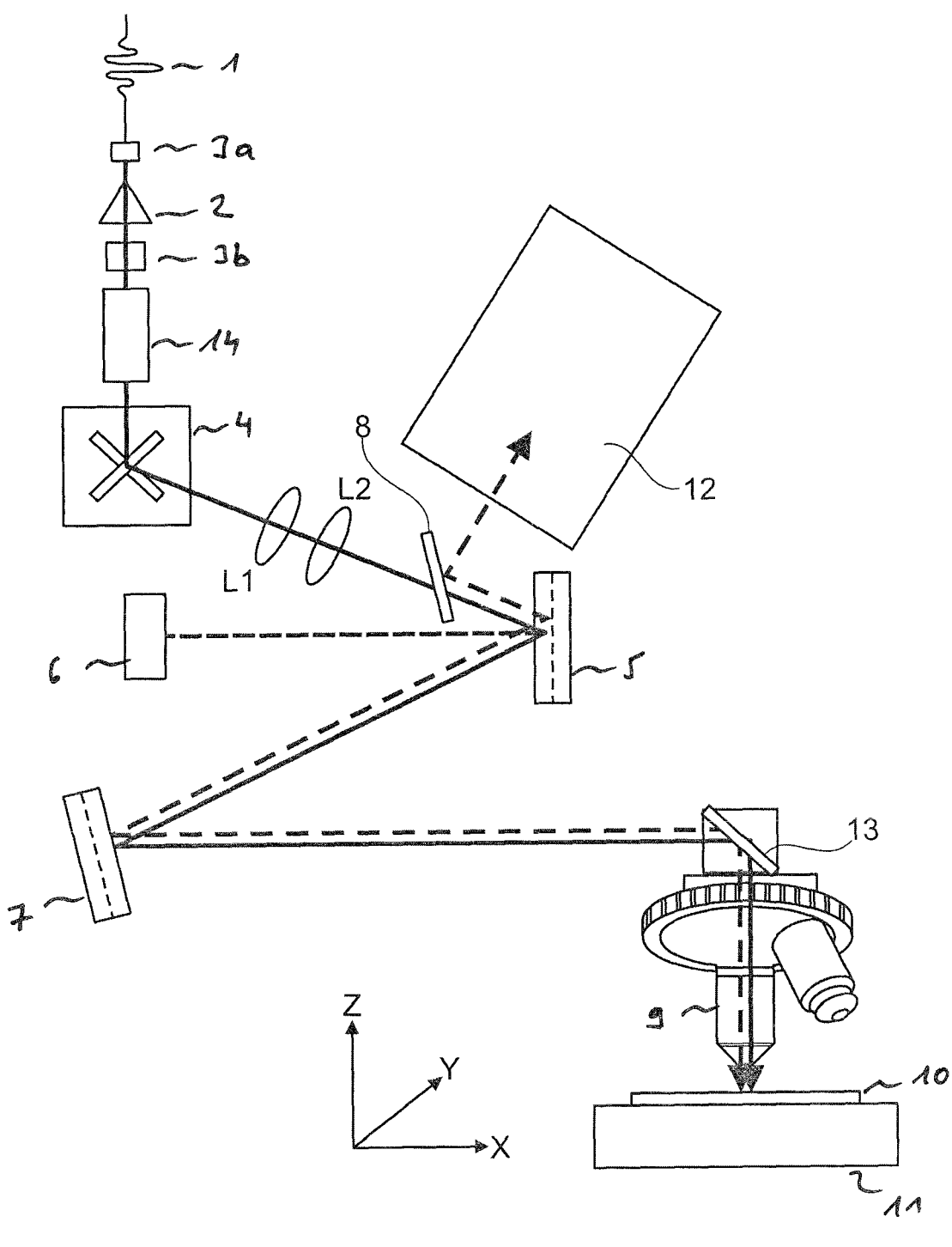
FIG. 4 shows a schematic view of a device for high-speed recording data according to another preferred embodiment.

FIGS. 1 and 2 show an embodiment wherein the beam shaping device 7 is transmitted by the laser light. However, in case the beam shaping device comprises, e.g., a spatial light modulator in reflection mode, the optical path may be altered as shown in FIG. 3. Again, the reading device 12 may be a sensor with its own DMD (see FIG. 3) or a simpler sensor without DMD (see FIG. 4), which utilizes the DMD 5 of the recording path.

The invention claimed is:

1. A method for high-speed recording data on or in a layer of a first material, the method comprising:
   providing a layer of the first material; and
   selectively illuminating a plurality of regions of the layer of the first material with laser light in order to selectively manipulate material at the plurality of regions of the layer of the first material;
   wherein the plurality of regions of the layer of the first material are selectively illuminated by means of a combination of a galvanometer scanner and a digital micromirror device.

2. The method of claim 1, wherein the laser light illuminating the plurality of regions of the layer of the first material passes, in this sequence, the galvanometer scanner and the digital micromirror device.

3. The method of claim 2, wherein the laser light passed from the galvanometer scanner illuminates only a section of a micromirror array of the digital micromirror device.

4. The method of claim 3, wherein the illuminated section amounts to less than 10% of the micromirror array of the digital micromirror device.

5. The method of claim 3, wherein the micromirror array of the digital micromirror device is scanned with the passed laser light by means of the galvanometer scanner.

6. The method of claim 2, wherein the laser light passed from the galvanometer scanner passes through collimating optics in order to align the laser light to a predetermined entrance angle with respect to the digital micromirror device.

7. The method of claim 1, wherein the laser light is provided by an ultra-short pulse laser.

8. The method of claim 1, wherein the layer of the first material is a ceramic material, which comprises at least one of: a metal nitride; a metal carbide; a metal oxide; a metal boride; or a metal silicide.

9. The method of claim 8, wherein the layer of the ceramic material is provided on a substrate, and wherein the substrate comprises a ceramic material different from the layer of the ceramic material.

10. The method of claim 9, wherein the layer of the ceramic material has a thickness no greater than 10 μm.

11. The method of claim 9, wherein the substrate comprises at least 90% by weight of one or a combination of: $Al_2O_3$, $TiO_2$, $SiO_2$, $ZrO_2$, $ThO_2$, $MgO$, $Cr_2O_3$, $Zr_2O_3$, $V_2O_3$, a metal nitride, a metal carbide, a metal boride, or a metal silicide.

12. A device for high-speed recording data on or in a substrate, the device comprising:

a laser source adapted to emit laser light;

a galvanometer scanner adapted to pass the laser light;

a digital micromirror device adapted to emit multiple laser beams formed from the passed laser light;

a substrate holder for mounting the substrate; and focusing optics adapted for focusing each of the multiple laser beams emitted by the digital mirror device onto the substrate mounted on the substrate holder, wherein the multiple laser beams are adapted to encode recorded data on the substrate;

wherein the galvanometer scanner is adapted to temporally distribute the laser light over the digital micromirror device.

13. The device of claim 12, wherein the galvanometer scanner is adapted to pass the laser light to only a section of a micromirror array of the digital micromirror device.

14. The device of claim 13, wherein the illuminated section amounts to less than 10% of the micromirror array of the digital micromirror device.

15. The device of claim 13, wherein the galvanometer scanner is adapted to scan the passed laser light onto the micromirror array of the digital micromirror device.

16. The device of claim 12, further comprising collimating optics in order to align the laser light distributed by the galvanometer scanner to a predetermined entrance angle with respect to the digital micromirror device.

17. The device of claim 12, wherein the laser source is an ultrashort pulse laser.

18. The device of claim 12, further comprising a reading device adapted to image the recorded data.

19. The device of claim 18, wherein the reading device comprises a further digital micromirror device.

20. The device of claim 18, further comprising abeam splitter between the digital micromirror device and the focusing optics, wherein the beam splitter allows for light emitted from the substrate to pass to the reading device.

21. The device of claim 18, further comprising a beam splitter between the galvanometer scanner and the digital micromirror device, wherein the beam splitter allows for light emitted from the substrate to pass to the reading device via the digital micromirror device.

* * * * *